United States Patent [19]

Konishi

[11] Patent Number: 4,933,937
[45] Date of Patent: Jun. 12, 1990

[54] NETWORK ADAPTER FOR CONNECTING LOCAL AREA NETWORK TO BACKBONE NETWORK

[75] Inventor: Kuniyoshi Konishi, Hachioji, Japan

[73] Assignee: Kabushiki Kaisha Toshiba, Kawasaki, Japan

[21] Appl. No.: 124,496

[22] Filed: Nov. 23, 1987

[30] Foreign Application Priority Data

Nov. 29, 1986 [JP]  Japan ................. 61-284507

[51] Int. Cl.⁵ ............................................. H04J 3/26
[52] U.S. Cl. .............................. 370/85.13; 370/94.1
[58] Field of Search .................. 370/85, 88, 94, 86, 370/85.13, 94.1; 340/825.05, 825.52

[56] References Cited

U.S. PATENT DOCUMENTS

| | | | |
|---|---|---|---|
| 4,597,078 | 6/1986 | Kempf | 370/88 |
| 4,672,607 | 6/1987 | Nakayashiki et al. | 370/88 |
| 4,706,081 | 11/1987 | Hart et al. | 370/94 |
| 4,789,982 | 12/1988 | Coden | 370/85 |
| 4,797,881 | 1/1989 | Ben-Artzi | 370/94 |

FOREIGN PATENT DOCUMENTS 54-68124  1/1979  Japan .
60-10839  1/1985  Japan .
2170079  12/1985  United Kingdom .

Primary Examiner—Douglas W. Olms
Assistant Examiner—Melvin Marcelo
Attorney, Agent, or Firm—Foley & Lardner, Schwartz, Jeffery, Schwaab, Mack, Blumenthal & Evans

[57] ABSTRACT

A table memory stores an address transformation table (AT table) which contains no address pairs therein before initialization of the system. A hash function memory stores a plurality of hash functions which are selectively used in correspondence with the sizes of a backbone network (BN) and a local area network (LAN), when an address pair consisting of a node address and a LAN address, of a LAN to which a node indicated by the node address belongs, is registered in the AT table. When a control unit receives frame data from the LAN or the BN, it automatically generates the above address pair consisting of the node address and the LAN address in the AT table by selecting one of the plurality of hash functions. During registration, if the AT table reaches the limit of its available storage space, and a new address is to be registered, the control unit then generates an AT table larger in size than the current AT table, using another hash function, and registers the already registered address pairs and the new address pair in the newly enlarged AT table.

17 Claims, 5 Drawing Sheets

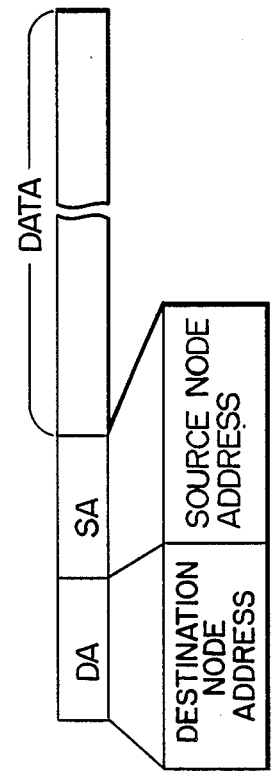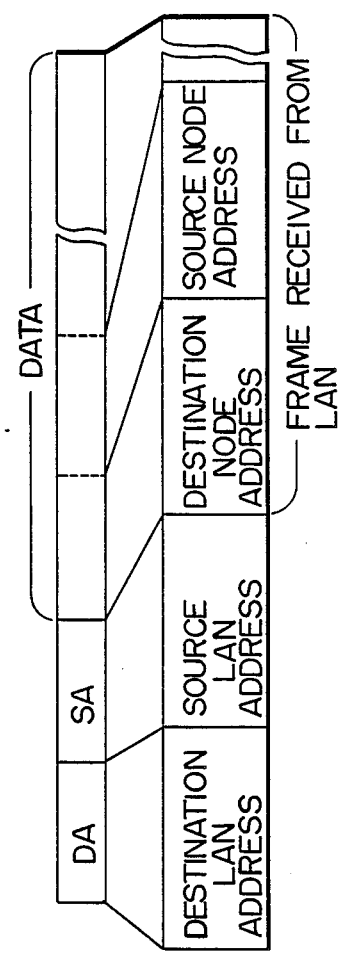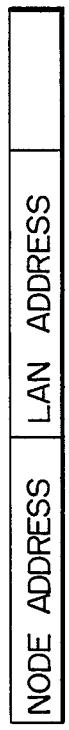
F I G. 3A
F I G. 3B
F I G. 3C
F I G. 4

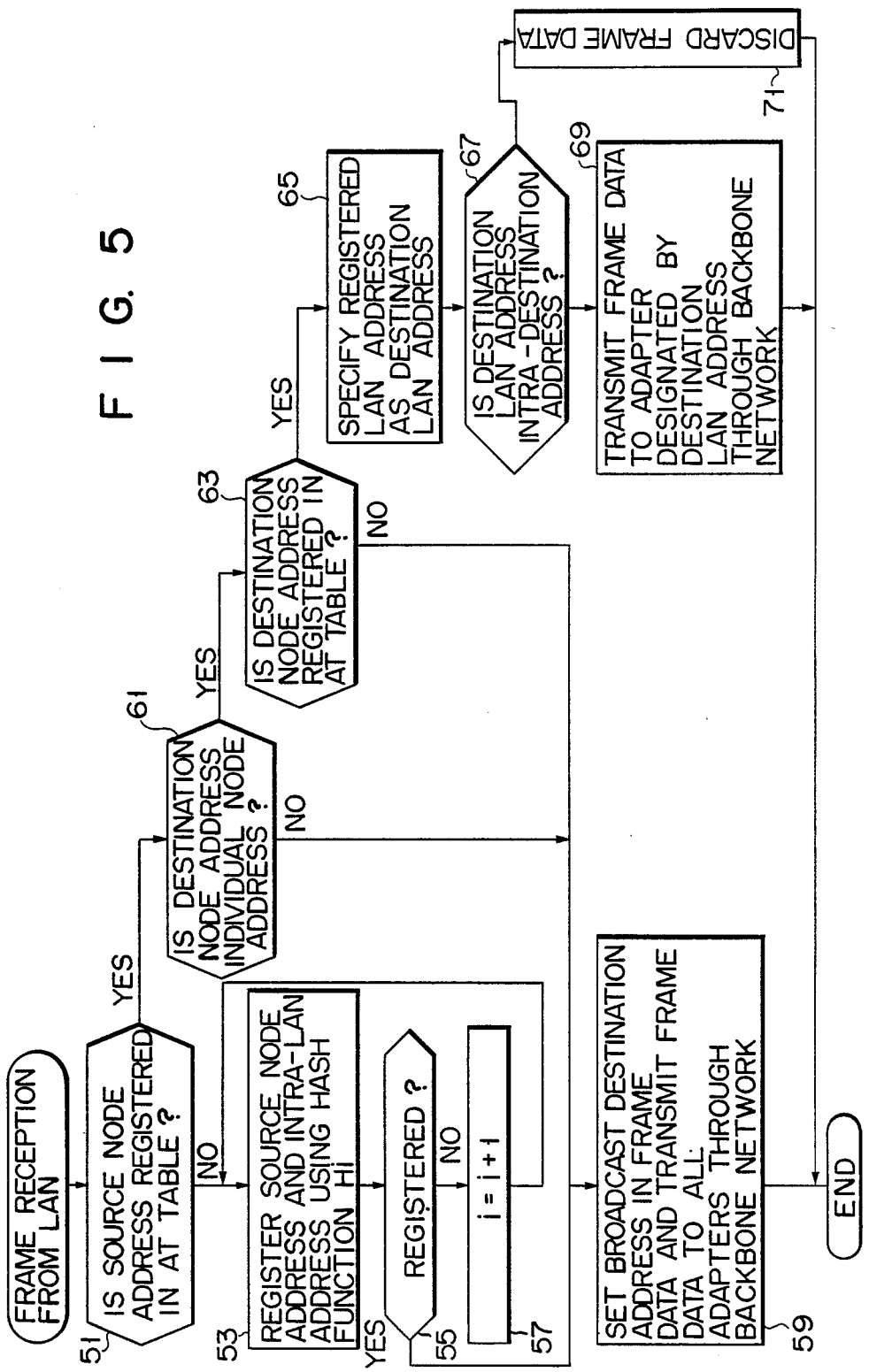

NETWORK ADAPTER FOR CONNECTING LOCAL AREA NETWORK TO BACKBONE NETWORK

BACKGROUND OF THE INVENTION

The present invention relates to a network adapter for connecting a local area network to a backbone network and, more particularly, to a network adapter comprising an address transformation table in which are registered pairs each consisting of a node address and a local area network address, indicating a local area network to which a node assigned with the node address belongs.

In a network system in which local area networks (to be hereinafter referred to as a LAN or LANs) are connected to a backbone network via network adapters, each network adapter receives data (frame data) concerning a LAN connected to itself. A destination node address is set in a destination address field of the frame data concerning the LAN, and a source node address is set in its source address field. If a destination node indicated by the received frame data is present in the connected LAN (intra-LAN), the network adapter discards the received frame data; otherwise, it generates frame data destined for another LAN to which the destination node is connected, and transmits the frame data onto the backbone network. A destination LAN address is set in a destination address field of the frame data concerning the backbone network, a source LAN address is set in its source address field, and frame data received from the LAN is set in its data field.

The frame data on the backbone network is received by a network adapter corresponding to a LAN indicated by the destination address field of this data. When the network adapter receives the frame data on the backbone network, it sends a data field portion of the frame data to a LAN connected to itself. The data concerning the LAN is received by a destination node indicated by the destination address field of this data.

The above is a description of the operation by which data is transferred among LANs, through the backbone network of the network system connecting some LANs thereto.

In the above network system, each network adapter connected to the backbone network must recognize the connection relationship among LANs, nodes, and their node addresses. In a conventional system, address pairs each consisting of a node address and a LAN address are provided for each network adapter, as hardware data or data in a non-volatile memory.

However, with this conventional system, each time a node is either added to or omitted from a LAN, or is exchanged for another type, the system operation is interrupted, and the hardware data, as well as data in the non-volatile memory, must be rewritten in all the network adapters.

SUMMARY OF THE INVENTION

It is an object of the present invention to provide a network adapter which can automatically generate an address pair, consisting of a node address and a LAN address, from a destination node address and a source node address transmitted on a LAN, and which can easily cope with system modification.

It is another object of the present invention to provide a network adapter which can vary the size of an address transformation table in which pairs consisting of node and LAN addresses are registered in accordance with a system configuration.

It is yet another object of the present invention to provide a network adapter which can delete an address pair having the lowest frequency of use and can register a new address pair when the capacity of a memory for storing an address transformation table becomes full.

In order to achieve the above objects, a network system comprises a backbone network to which a plurality of network adapters are connected, and local area networks in which a plurality of nodes are connected to each of the network adapters, the network adapter comprising an address conversion table in which are registered address pairs each consisting of a node address indicating the corresponding node and a local area network address indicating a local area network to which the corresponding node belongs; a hash function memory which stores a plurality of hash functions in correspondence with required sizes of the network system, and which is used when the address pairs are registered and when the registered address pairs are checked; and control means including receiving means for receiving, through a LAN interface, a first frame data having a source node address and a destination node address from a source node, registration check means for checking whether the source node address and the destination node address are registered in the address conversion table, using an address obtained by the hash function, registration means for registering the address pair in the address conversion table, using the address obtained by the hash function when the source node address is not registered in the address conversion table, and transmission means for transmitting, through a backbone network interface, a second frame data which includes the first frame data and either a broadcast destination address or a destination LAN address.

According to the network adapter of the present invention, when frame data is received from a LAN and a backbone network, an address pair consisting of a node address and a LAN address can be automatically generated, based on the received frame data. When an address transformation table in use becomes full, a smallest table among address transformation tables larger in size than the current table, is generated. Thus, an address transformation table having a size suitable for the current system configuration can be employed.

When the capacity of a memory for storing the address conversion table becomes full, an address pair having the lowest frequency of use of all the address pairs currently registered in the address transformation table is deleted, whereby a new address pair can be registered. In this way, a network system of any required size can be constituted.

BRIEF DESCRIPTION OF THE DRAWINGS

Other objects and features of the present invention will become apparent from the following description, taken in connection with the accompanied drawings in which:

FIGS. 3A–3C are a format of frame data used in the system shown in FIG. 2;

FIG. 4 is a view showing an entry structure of an address transformation table stored in a table memory shown in FIG. 1;

FIG. 5 is a flow chart showing a processing sequence of the network adapter upon reception of frame data from a LAN.

DETAILED DESCRIPTION OF THE PREFERRED EMBODIMENTS

Figure 1:
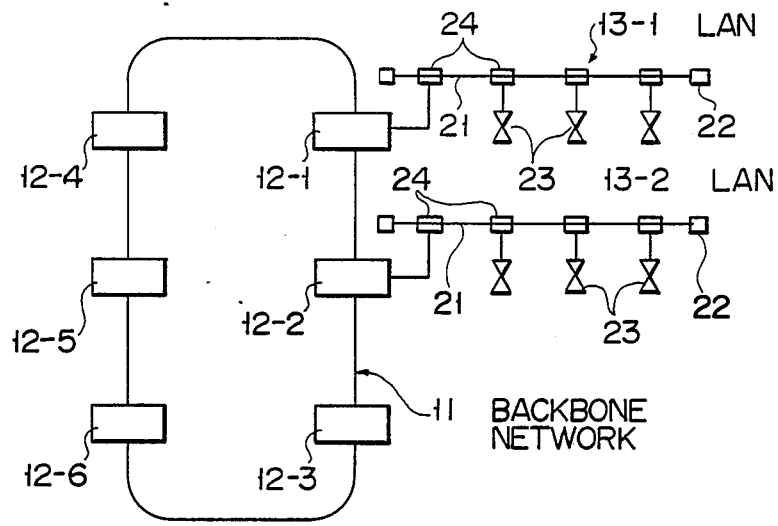
FIG. 1 is a block diagram of a network system to which the present invention applies.
Figure 2:
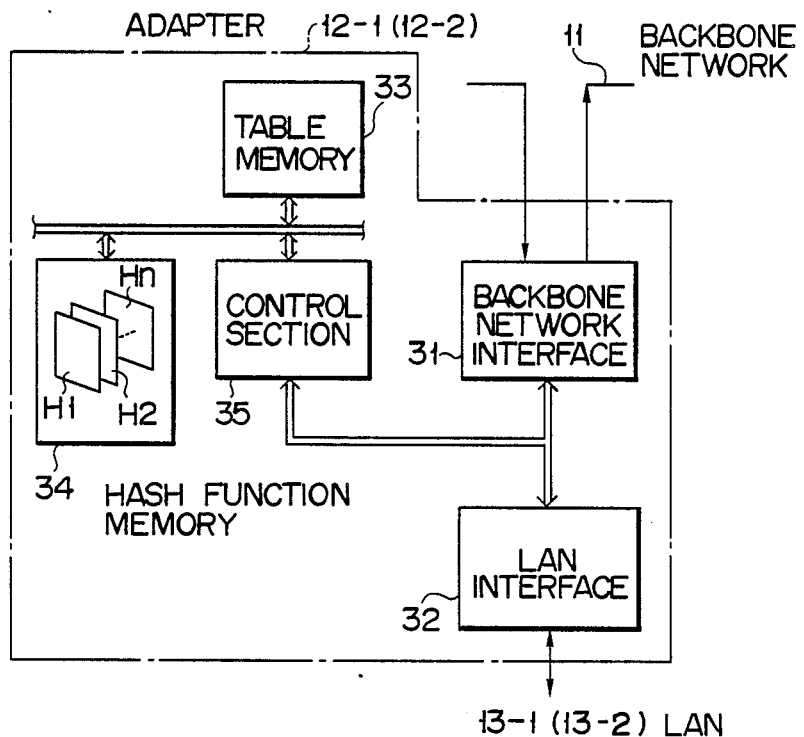
FIG. 2 is a block diagram of an embodiment of a network adapter according to the present invention, which is applied to the network system shown in FIG. 1.

FIG. 1 is a block diagram of a network system to which a network adapter of the present invention is applied. FIG. 2 is a block diagram showing an embodiment of the network adapter of the present invention. For the sake of illustrative simplicity, FIG. 1 shows LANs 13-1 and 13-2 connected only to network adapters 12-1 and 12-2. However, LANs are similarly connected to other network adapters 12-3 through 12-6. A plurality of network adapters 12-1 through 12-6 are connected to constitute a backbone network. In the embodiment shown in FIG. 1, a ring network is exemplified, to which network adapters 12-1 through 12-6 are connected in a ring shape. However, the backbone network is not limited to a ring network, but can be a bus network or a star network. Network adapters 12-1 and 12-2 are respectively connected to LANs 13-1 and 13-2. In this embodiment, each LAN employs a bus network. However, the LAN is not limited to the bus network, but can be a ring network or a star network. Similar LANs are connected to other network adapters 12-3 through 12-6. Each LAN 13-i is connected to a plurality of transceivers 24, each of which is connected to a node 23. One of transceivers 24 is connected to network adapter 12-i. As is shown in FIG. 2, network adapter 12-i has backbone network interface 31 for connection with backbone network 11, and LAN interface 32 for connection with LAN 13-i. Table memory 33 stores one of n address transformation tables of different sizes (different numbers of entries). Each of these n address transformation tables (to be referred to as AT tables hereinafter) stores address pairs each consisting of a node address and a LAN address indicating a LAN to which a node assigned with the node address belongs. If n AT tables are given by T1, T2, ..., Tn, they have sizes satisfying the relation T1 <T2 <... <Tn. Hash function memory 34 stores n types of hash functions H1 through Hn subjected to registration of the address pairs described above. Control section 35 is connected to backbone network interface 31, LAN interface 32, table memory 33, and hash function memory 34 via a system bus, and controls these elements.

Control section 35 comprises, for example, an n-bit microprocessor; 16-bit microprocessor 80286 available from Intel Corp. (U.S.A.) can be employed for this purpose.

FIGS. 3A through 3C show formats of frame data used in the network shown in FIG. 1. Frame data consists of a destination address field (DA field), a source address field (SA field), and a data field (DATA field), as is shown in FIG. 3A. When the frame data as shown in FIG. 3A is transmitted on LAN 13-i, a destination node address is set in the DA field, and a source node address is set in the SA field, as is shown in FIG. 3B.

When the frame data as shown in FIG. 3A is transmitted onto backbone network 11, a destination LAN address is set in the DA field, a source LAN address is set in the SA field, as is shown in FIG. 3C, and frame data, shown in FIG. 3B, received from LAN 13-i is set in the DATA field.

FIG. 4 shows an entry structure of the AT table stored in table memory 33. As is shown in FIG. 4, each entry of the AT table has a field in which is set a pair consisting of a node address and a LAN address indicating a LAN to which a node indicated by the node address is connected.

Figure 6A:
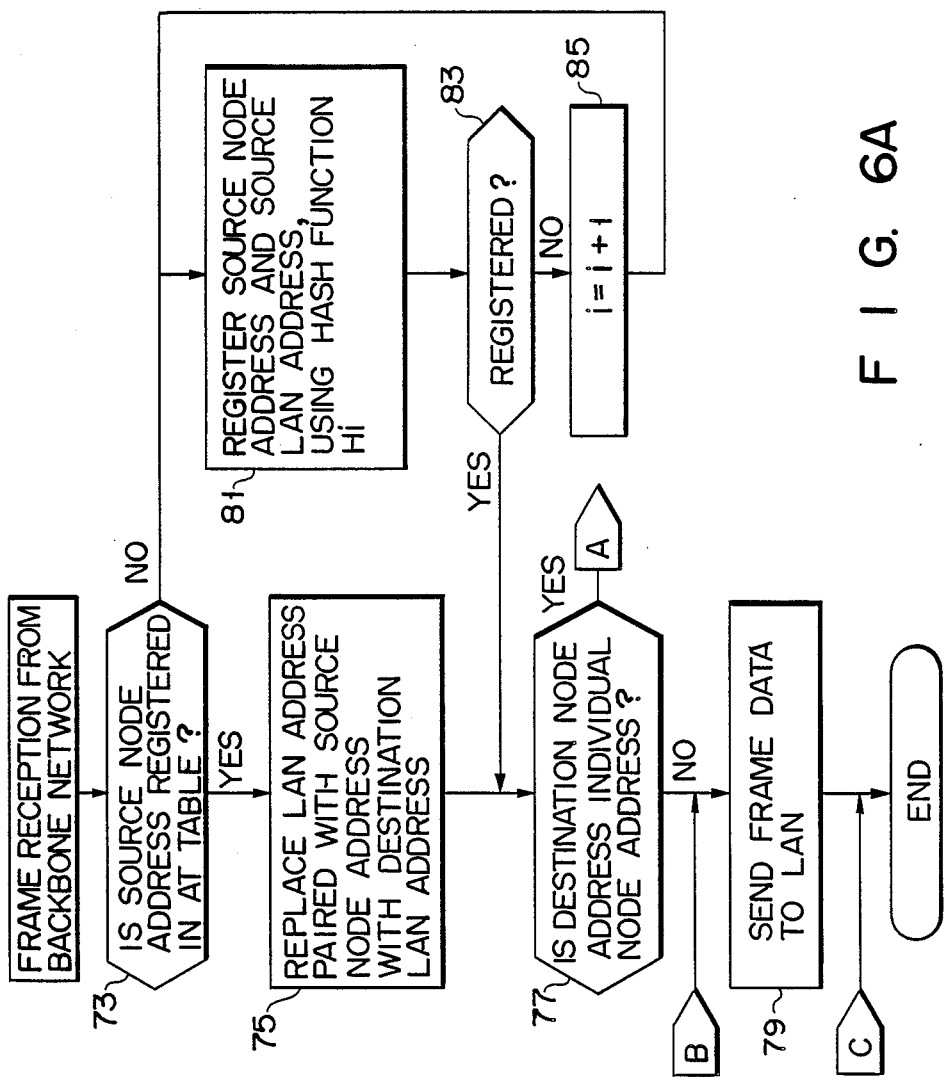
FIGS. 6A and 6B are flow charts showing a processing sequence of the network adapter upon reception of frame data from a backbone network.
Figure 6B:
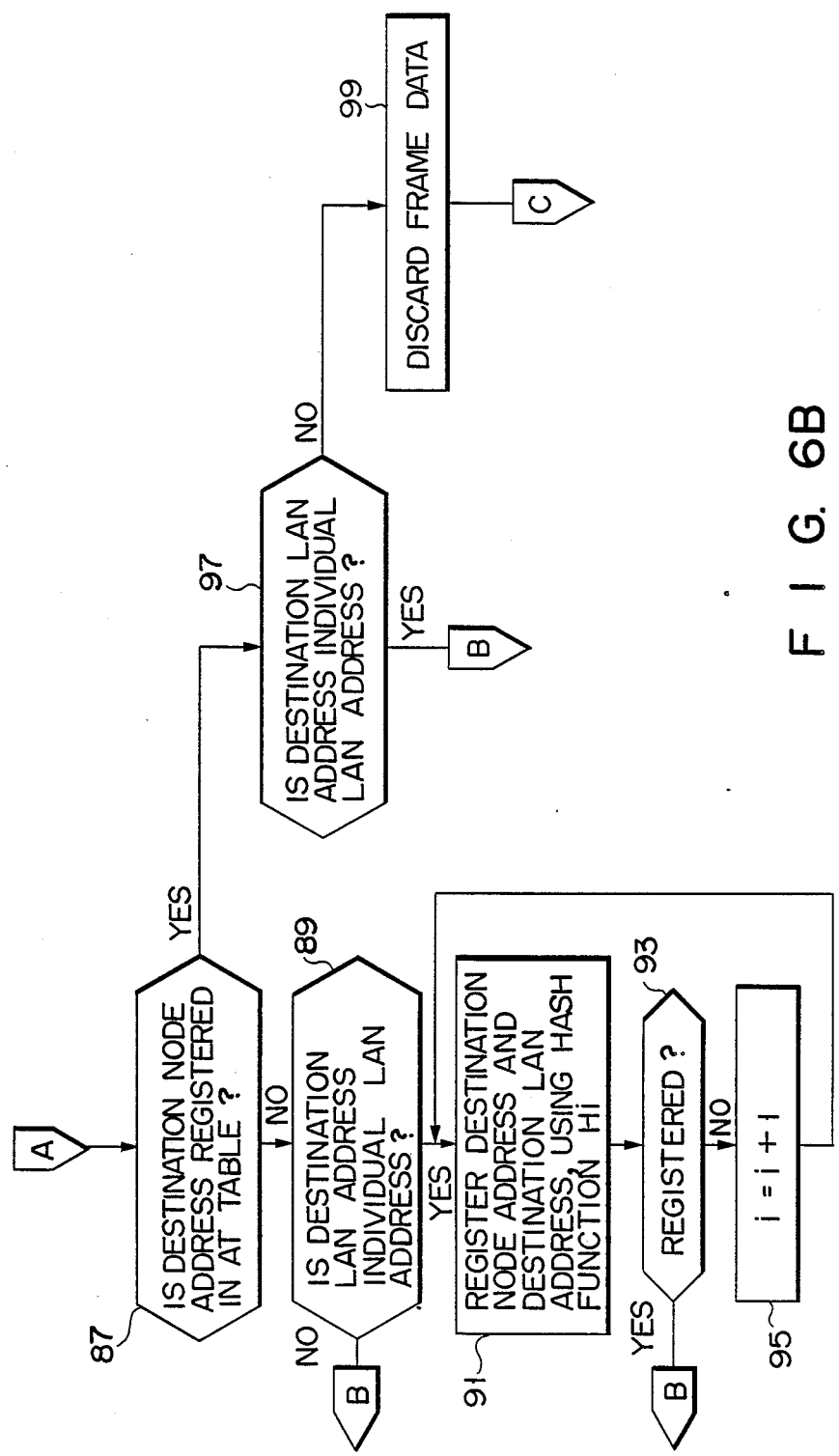

An operation of the embodiment of the present invention will be described with reference to FIGS. 5, 6A, and 6B. FIG. 5 is a flow chart of the network adapter upon receipt of frame data from a LAN, and FIGS. 6A and 6B are flow charts of the network adapter upon receipt of frame data from the backbone network.

Network adapter 12-i in network 11 is turned on when it does not recognize the relationships between the LAN addresses, LANs, nodes, and node addresses. More specifically, each entry block of the AT table in table memory 33 is empty when the system is powered up. In this embodiment, an address pair is generated for each empty entry block of the AT table. This is called a "learning" procedure. There are two types of learning procedures, i.e., a first learning procedure for generating the address pair from frame data concerning the LAN, and a second learning procedure for generating an address pair from frame data concerning the backbone network. When the system is powered up, smallest AT table T1 of tables T1 through Tn is used.

The first learning procedure will be described hereinafter with reference to the flow chart shown in FIG. 5, regarding a case wherein network adapter 12-i receives frame data concerning LAN 13-1.

When control section 35 of network adapter 12-i receives frame data concerning LAN 13-1, it checks, in accordance with hash function Hi stored in hash function memory 34, in step 51, if a source node address set in a source address field (SA) of the frame data is registered in the AT table in table memory 33. Hash function Hi is a hash function number i (initial value is 1) indicated by a hash function pointer (not shown) of hash functions H1 through Hn in hash function memory 34. If NO in step 51, a pair consisting of the source node address and an intra-segment address (a LAN address indicating LAN 13-1 connected to itself) is registered in the AT table in table memory 33, using hash function Hi in step 53. The registration in step 53 utilizes the fact that a node having the source node address of the frame data concerning the LAN to which the network adapter is connected, is connected to identical LAN 13-i.

Control section 35 checks in step 55 if the pair consisting of the source node address and the intrasegment address is stored in the AT table. If YES in step 55, control section 35 generates frame data having a format as shown in FIG. 3C, in which case a broadcast LAN address common to all the LANs is set in address field DA, the intra-segment address is set in source address field SA, and received frame data is set in data field DATA, and control section 35 sends the frame data onto backbone network 11 via backbone network interface 31, in step 59.

On the other hand, if the registration in step 55 fails due to the AT table in table memory 33 being full, control section 35 increments hash function number i by +1 in step 57, and the flow returns to step 53. As a result, control section 35 re-registers all the address pairs registered in the AT table in table memory 33, using a hash function of the incremented hash function number i, and performs registration in step 53, using the new hash function. For example, if the AT table in table memory 33 is T1, the registration in step 53 is performed using hash function H1. If address pairs cannot be registered because T1 is full, the address pairs registered in T1 are re-registered in T2, using hash function H2, and the registration in step 53 is again executed, using hash function H2.

When the size of the network system becomes larger than the starting system, and table memory 33 itself reaches full capacity, an address pair having the lowest frequency of use of the address pairs registered in the AT table is then deleted, and a new address pair is registered. Therefore, if the size of the network system exceeds a predetermined size, the network adapter of the present invention can cope with this situation. In order to search for the address pair having the lowest frequency of use, the number of times an address pair is accessed is counted, by means of which the address pair having the lowest frequency of use can be detected.

The above is a description of the first learning procedure.

An address transformation procedure utilizing the AT table in table memory 33 will be described with reference to the flow chart in FIG. 5 for a case wherein network adapter 12-i receives frame data from LAN 13-i, as described above. If control section 35 of network adapter 12-i determines in step 51 that the source node address is stored in the AT table in table memory 33, it checks in step 61 if the destination node address set in destination address field DA is an individual node address. If YES in step 61, control section 35 checks in step 63 if the destination node address is registered in the AT table in table memory 33. If YES in step 63, control section 35 specifies the LAN registered in the corresponding entry of the AT table to be paired with the node address as a destination segment address in step 65.

Control section 35 then checks in step 67 if the destination segment address is an intra-LAN address. If NO in step 67, control section 35 generates and sends frame data having a format shown in FIG. 3C onto backbone network 11 via backbone network interface 31 in step 69. The frame data shown in FIG. 3C consists of destination address field DA in which the destination LAN address is set, source address field SA in which the intra-LAN address is set, and data field DATA in which the received frame data is set.

If YES in step 67, i.e., if the destination segment data is the intra-LAN address, the received frame data is not for another LAN, and hence, control section 35 does not send the data onto backbone network and discards the frame data in step 71.

The address transformation procedure utilizing the AT table upon reception of the frame data from the LAN has been described. Note that if it is determined in step 61 that the destination node address is not an individual node address, or if it is determined in step 63 that the destination node address is not registered in the AT table, step 59 is executed.

The second learning procedure will be described with reference to the flow charts shown in FIGS. 6A and 6B for a case wherein network adapter 12-i receives the frame data concerning backbone network 11.

Network adapter 12-i receives frame data concerning backbone network 11 when a broadcast address or an intra-LAN address is set in destination address field DA of the frame data. Control section 35 of network adapter 12-i checks using hash function i in step 73 if the source node address set in data field DATA of the received frame data is registered in the AT table of table memory 33. If NO in step 73, control section 35 registers a pair of the source node address and the source LAN address (in this case, the LAN address of LAN 13-i) set in source address field SA of the received frame data in the AT table of table memory 33 in step 81.

Control section 35 checks in step 83 if the registration in step 81 is successful. If YES in step 83, control section 35 checks in step 77 if the destination node address set in data field DATA of the received frame data is an individual node address. If NO in step 77, control section 35 sends the data field DATA portion of the received frame data, i.e., the frame data transmitted from node 23 of LAN 13-i to LAN 13-i via LAN interface 32.

However, if YES in step 77, control section 35 checks in step 87 if the destination node address is registered in the AT table in table memory 33. If NO in step 87, control section 35 checks in step 89 if the destination LAN address set in destination address field DA of the received frame data is an individual LAN address. If YES in step 89, control section 35 registers a pair of the destination node address and the destination LAN address in the AT table of table memory 33 using hash function Hi in step 91. Then, control section 35 checks in step 93 if the registration in step 91 is successful. If YES in step 93, the flow advances to step 79.

If the registration in step 81 (91) is unsuccessful since the AT table in table memory 33 is full, control section 35 increments hash function number i by t1 in step 85 (95) and returns to step 81 (91). Then, the control function re-registers all address pairs registered in the AT table in table memory 33 using a hash function of hash function number i incremented in step 85 (95), and performs registration in step 81 (91) using this new hash function.

The second learning procedure has been described. Note that if YES in step 73, control section 35 rewrites the LAN address registered in the corresponding entry to be paired with the source node address using the source LAN address set in field SA of the received frame data in step 75. Thereafter, step 77 is executed. If YES in step 87, control section 35 checks in step 97 if the destination LAN address set in destination address field DA of the received data is an intra-LAN address. If YES in step 97, step 79 is executed. However, if NO in step 97, since the received frame data is not destined to a node connected to LAN 13-i, control section 35 discards the data in step 99. As a result, no data is transmitted to LAN 13-i.

What is claimed is:

1. A network system which comprises a backbone network, to which a plurality of network adapters are connected; and local area networks, in which a plurality of nodes are connected, said network adapters being connected to said local area networks said network adapters comprising:

an address conversion table in which are registered address pairs each address pair consisting of a node address indicating the corresponding node and a local area network address indicating a local area network to which said corresponding node belongs;

a hash function memory which stores a plurality of has functions in correspondence with information concerning the size of the network system, and which is used when the address pairs are registered and when the registered address pairs are checked, and first control means including:

receiving means for receiving, via a LAN interface, first frame data, having a source node address and a destination node address, from a source node;

registration check means for checking whether the source node address and the destination node address are registered in said address conversion table, using an address obtained by the has function;

registration means for registering the address pair in said address conversion table, using the address obtained by a first hash function, when the source node address is not registered in said address conversion table; and transmission means for transmitting, via a backbone network interface, second frame data which includes the first frame data and either a broadcast destination address or a destination LAN address; and second control means which includes reregistration means for generating, suing a second hash function obtained from said hash function memory, a memory space larger than the memory space generated using the first hash function, and for reregistering, when said address conversion table corresponding to the first hash function has no available storage space, the address pairs which have been registered, using addresses obtained by the second hash function.

2. A network system according to claim 1, wherein the broadcast destination address is generated within said control means when the source node address and/or the destination node address has not been registered in said address conversion table.

3. A network adapter according to claim 2, wherein said second control means includes substitution means which, when the address conversion table is full, deletes an address pair having the lowest frequency of use of the address pairs which have been registered in said address conversion table, and registers a new address pair therein.

4. A network system according to claim 1, wherein the destination LAN address is obtained from said address conversion table when the source node address and the destination node address have been registered in said address conversion table.

5. A network adapter according to claim 1, wherein the second frame data transmitted from said backbone network is received via said backbone network interface, and the presence or absence of the registration of the source node address and the destination node address is checked by said registration check means.

6. A network adapter for connecting a local area network (LAN), to which a plurality of nodes are connected, and a backbone network, to which a plurality of LANs are connected, the network adapter comprising:

an address conversion table for registering an address pair including a node address designating the node and a LAN address designating said LAN to which the node belongs;

receiving means for receiving a first frame data having a source node address designating a source node and a destination node address designating a destination node, the first frame data being supplied from the source node;

node registration checking means for determining whether or not the source node address is registered in the address conversion table;

registration means for registering an address pair when it is determined by the node registration checking means that the source node address is not registered in the address conversion table; and transmission means for transmitting a second frame data, or a third frame data to the backbone network in accordance with the determination result of the node registration checking means, the second frame data having a source LAN address to which the source node belongs and a broadcast destination LAN address, and the third frame data having the first frame data, the source LAN address, and the destination LAN address to which the destination node belongs.

7. A network adapter to claim 6, further comprising:

a table memory having a plurality of address conversion tables having different data entries; and a hash function memory for storing a plurality of hash functions corresponding to the address conversion tables, respectively;

wherein either the registration means registers the address pair in the address conversion table using the hash functions corresponding to the number of the data entries, or the node registration checking means determines whether the node address is registered in the address conversion table using the hash function used for the registration.

8. A network adapter according to claim 7, when registration means further c comprising: reregistration means for altering the hash function, for registering the reregistered address pairs in the address conversion table into a new address conversion table having larger data entries using the altered hash function, and for registering the address pair to be registered in the new address conversion table, when the address conversion table is filled with registered address pairs, and no more address pairs can be registered.

9. A network adapter according to claim 7, further comprising: replacing means for deleting an address pair having the lowest frequency of use of the address pairs which have been registered in the address conversion table, and for reregistering a new address pair, when the address conversion table is filled with registered address pairs and the new address pair cannot be registered in the address conversion table.

10. A network adapter according to claim 6, wherein the address pair is not registered in the address conversion table when the network adapter is installed.

11. A network adapter according to claim 6, wherein the transmission means outputs the second frame data to the backbone network when the node registration means determines that the source node address or the destination node address is not registered in the address conversion table.

12. A network adapter according to claim 6, further comprising: LAN address checking means for determining whether the LAN address corresponding to the destination node address reregistered in the address conversion table is the source LAN address, wherein the transmission means outputs the third frame data to the backbone network, when the node registration checking means determines that the source node address and the destination node address are registered in the address conversion table and the LAN address checking means determines that the LAN address is not the source LAN address.

13. A network adapter according to claim 6, further comprising: node-type checking means for determining whether the destination node address is an individual node address, when the node registration checking means determines that the source node address is registered in the address conversion table, wherein the transmission means outputs the second frame data to the backbone network when the node-type checking means determines that the destination node address is not an individual node address.

14. A network adapter having a backbone network to which a plurality of network adapters are connected, having a plurality of local area networks (LANs) connected to the network adapters, respectively, and having a plurality of nodes connected to each of the LANs, the network adapter comprising:
- address conversion table for registering an address pair including a node address, designating a node, and a LAN address, designating the LAN to which the node belongs;
- receiving means for receiving a second frame data having a source node address designating a source node, a destination node address designating a destination node, a source LAN address to which the source node belongs, a broadcast destination LAN address designating that all the LANs are destination LANs; or a third frame data having the source node address, the destination node address, the source LAN address and a destination LAN address designating the LAN to which the destination node belongs, the second and third frame data being supplied from another network adapter through the backbone network;
- node registration checking means for determining whether the source node address and/or the destination node address is registered in the address conversion table;
- registration means for registering the address pair when the node registration checking means determines that the node address is not registered in the address conversion table;
- LAN address checking means for determining whether the destination LAN address is a LAN address designating the connected LAN, that is, intra-LAN; and
- transmission means for outputting to the LAN a first frame data having the source node address and the destination node address, or for discarding the data, in accordance with determination results of the LAN address checking means.

15. A network adapter according to claim 14, further comprising:
- a table memory storing a plurality of address conversion tables having different data entries; and
- a hash function memory for storing a plurality of hash functions corresponding to the address conversion tables, respectively, wherein either the registration means registers the address pair using the hash function corresponding to the number of data entries, or the node registration checking means determines whether the node address is registered in the address conversion table using the hash function used for the registration.

16. A network adapter according to claim 15, the reregistration means further comprising:
- reregistration means for altering the hash function, for registering the registered address pairs in the address conversion table into a new address conversion table having larger data entries using the altered hash function, and for registering the address pair to be registered in the new address conversion table, when the address conversion table is filled with the registered address pairs, and no more address pairs can be registered.

17. A network adapter according to claim 14, further comprising:
- LAN address replacing means for replacing an LAN address, which has been registered and paired with the source node address in the address conversion table, with the source LAN address received by the receiving means, when the node registration checking means determines that the source node address has been registered in the address conversion table;
- node address checking means for determining whether the destination node address received by the receiving means is an individual node address in the connected LAN, that is, intra-LAN, wherein the transmission means outputs to the LAN a first frame data having the source node address and the destination node address, after the received LAN address is registered in the address conversion table by the registration means or by the LAN address replacing means; the node address checking means determines whether the destination node address is the individual node address in the connected LAN, that is, intra-LAN.

* * * * *